Figure 1:
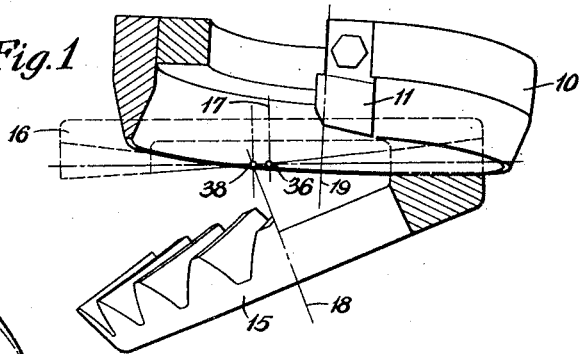

Sept. 10, 1929.  E. WILDHABER  1,727,740

METHOD OF PRODUCING BEVEL GEARS

Filed March 1, 1927

INVENTOR
*Ernest Wildhaber*
BY
*B. Schlesinger*
ATTORNEY

Patented Sept. 10, 1929.

1,727,740

UNITED STATES PATENT OFFICE.

ERNEST WILDHABER, OF ROCHESTER, NEW YORK, ASSIGNOR TO GLEASON WORKS, OF ROCHESTER, NEW YORK, A CORPORATION OF NEW YORK.

METHOD OF PRODUCING BEVEL GEARS.

Application filed March 1, 1927. Serial No. 171,862.

The present invention relates to a method of producing longitudinally curved tooth bevel gears and particularly to a method of producing longitudinally curved tooth bevel gears in which two side faces of the blank may be cut simultaneously.

The primary object of this invention is to provide a method whereby the tooth surfaces of each member of a pair of bevel gears may be cut two sides simultaneously with a straight sided or conical cutter, while eliminating "bias bearing" between the mating tooth surfaces. With the methods heretofore commonly employed in cutting curved tooth bevel gears, a conical or straight sided cutter is used and one member of the pair, at least, is cut one side at a time. This method results in a bias or diagonal bearing between the contracting tooth surfaces of a pair.

The present invention permits of producing curved tooth bevel gears without bias bearing, that is, of an improved character as compared with those generated by previous methods and enables both members to be cut in a very rapid operation.

The preferred method of practising this invention is illustrated in the accompanying drawings. It will be understood, however, that the invention is capable of further modifications within its scope and within the limits of the accompanying claims.

Figure 2:
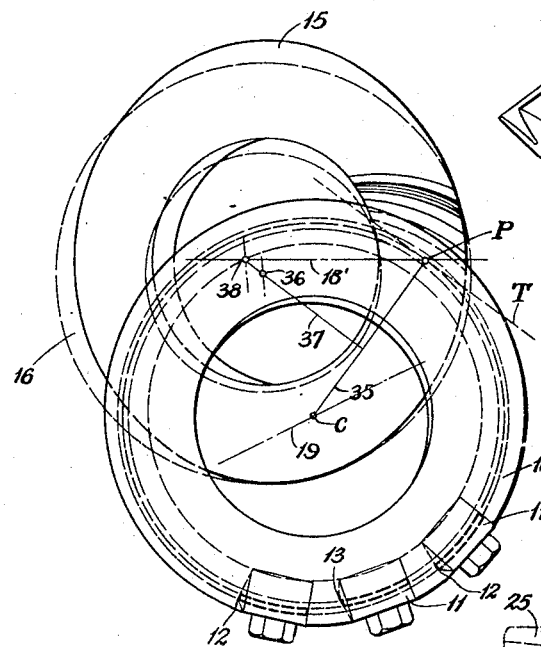
Figure 3:
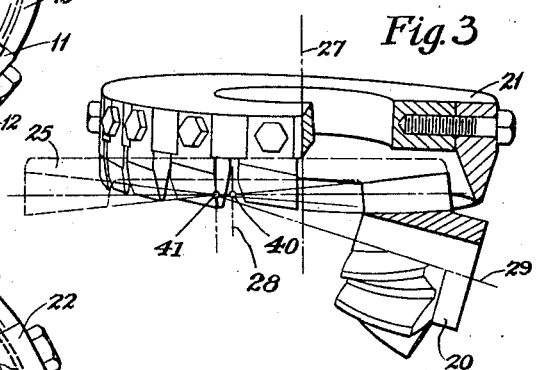
Figure 4:
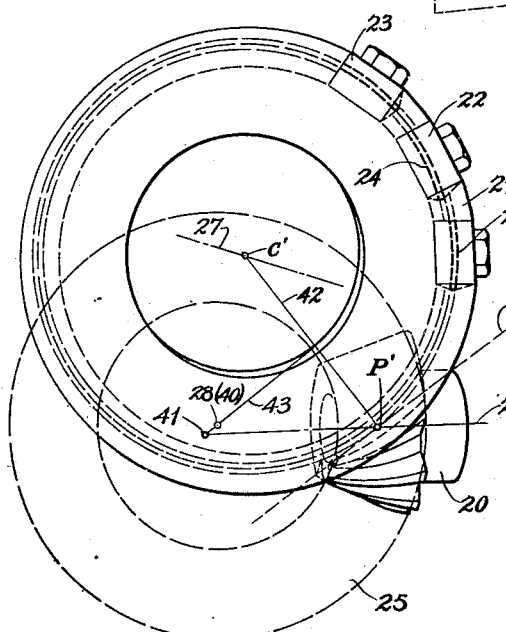

In the drawings:

Figures 1 and 2 are a plan view and side elevation, respectively, illustrating diagrammatically the preferred method of producing the gear or larger member of the pair according to this invention; and Figures 3 and 4 are similar views illustrating the application of the same principles to the production of the pinion or smaller member of the pair.

It is not new to produce curved tooth bevel gear pairs, in which the tooth surfaces of each member are cut two sides simultaneously. Such gears, as produced heretofore, however, have not been as strong as gears cut one side at a time, since they were cut either "parallel" or uniform depth, or with tooth bottoms lying on a conical surface whose apex was outside the pitch cone apex of the blank. The "parallel" depth method of cutting produces a gear whose teeth are weak at their inner ends because the height of the tooth remains constant while its width and the size of the blank diminish and because the gear teeth produced with a male tool are of excessively tapering thickness while the gear teeth produced by the complementary female tool are of constant thickness. The other method of cutting referred to produces a gear whose teeth are somewhat weak at their outer ends beause of the increased depth of the tooth there as compared with its depth at its inner end. For this reason, it is more usual to cut the gear or larger member of a pair two sides simultaneously and the pinion or smaller member one side at a time. Here, however, the teeth of one member of the pair taper longitudinally to a small extent, only, while the required tooth taper is placed mainly on the teeth of the other member. Where the gears are cut, moreover, with a straight sided or conical cutter, whether both or only one member be cut two sides simultaneously, a "bias bearing" or diagonal tooth surface contact will result when the mating gears are in mesh. In other words, instead of having the bearing or tooth surface contact extend an equal distance above and below the pitch line, it extends diagonally across the mating tooth surfaces and the bearing at one end of the teeth is above the pitch line and at the other end below it.

With the present invention, both members of the pair can be cut with a straight sided or conical cutter two sides simultaneously with teeth of tapering depth and preferably with tooth bottoms running toward their apexes and bias bearing is eliminated. A gain in production time is, therefore, achieved over the method most usually employed and at the same time a more satisfactory tooth bearing or tooth surface contact is obtained. These results are accomplished with the present invention by cutting each member of the pair in a generating operation where the tool and blank are moved relatively to each other as though the blank were meshing with a crown gear whose axis is offset from the axis of the blank. This is a departure from the methods heretofore employed in cutting bevel gears, since the bevel gear blank is usually generated conjugate to a basic crown gear whose axis intersects the axis of the blank in its apex.

The preferred method of cutting a pair of gears according to this invention is illustrated in the drawings. Figures 1 and 2 show how the tooth surfaces of the gear blank are cut. Preferably, a rotary annular face mill will be employed as the cutting tool, though it is to be understood, that, if desired, a pair of reciprocating planing tools which move in arcuate paths may be used instead.

A rotary face mill is shown at 10 in Figure 1 for cutting the gear. This face mill is provided with a plurality of cutting blades 11. Each cutting blade may be provided with two side finish cutting edges or, as shown, alternate blades may be provided with finish cutting edges 12 and 13 for finish cutting opposite side tooth faces of the blank.

The finish cutting edges 12 and 13 of the tool are of straight profile, representing straight sided or conical tooth surfaces of the basic gear with which the blank is to be rolled for generation.

The cutter 10 is so positioned relative to the gear blank 15 to be cut that it represents the basic gear with which the blank is to be rolled and will cut teeth of tapering depth. In Figures 1 and 2, this basic gear is shown as a true crown gear 16, namely, a gear having a plane pitch surface. This crown gear 16 has an axis 17 which is offset from the axis 18 of the blank 15. During the generating operation, the tool 10 is rotated on its axis 19 in engagement with the blank and the tool and blank are simultaneously moved relatively to each other, as though the blank were meshing with the basic gear 16. This operation is effected, preferably, by rotating the gear blank 15 on its axis 18 and simultaneously moving the tool and blank relatively to each other about an axis 17, representing the axis of the crown gear 16, and offset from the axis 18 of the blank.

The cutting edges 12 and 13 of the tool 10 sweep out simultaneously two adjacent side tooth faces of the blank. After two tooth faces have been completely generated, the tool and blank are withdrawn relatively to each other and the blank indexed. The tool and blank are then brought back into engagement and another pair of tooth surfaces cut. The alternate cutting and indexing proceeds until the blank has been completely cut.

The pinion blank 20 is cut in a similar manner. The rotary annular face mill 22 is again provided with a plurality of cutting blades 23 and these cutting blades may, each of them, have two side finish cutting edges, or as shown, alternate blades may be provided with finish cutting edges 23 and 24 for finish cutting opposite side tooth faces of the blank. The side cutting edges 23 and 24 are again of straight profile, representing conical tooth surfaces of a basic gear such as the crown gear shown in dotted lines at 25.

The tool 21 is again positioned so that its cutting edges represent tooth surfaces of the basic gear 25 with which the blank is to be rolled and so that teeth of tapering depth will be cut. The tool is again rotated on its axis 27 in engagement with the blank and simultaneously the tool and blank are moved relatively to each other as though the blank were meshing with a basic gear 25 whose axis 28 is offset from the axis 29 of the blank. In this operation, the blank 20 is, preferably, rotated on its axis 29 and an additional relative movement is imparted between the tool and blank about an axis 28 offset from the axis 29 of the blank and representing the axis of the basic crown gear 25.

The two basic crown gears 16 and 35 have teeth whose spiral angles are equal, and their axes 17 and 28, respectively, are offset equal amounts from the axes 18 and 29, respectively, of the two blanks. The cone distances of the two crown gears are also preferably equal. The teeth of these two crown gears, are, of course, however, of opposite hand. The same tool 10 or 21 may, therefore, be used in cutting both members of the pair simply by locating its axis above or below the crown gear axes, as indicated in Figures 2 and 4.

It will be noted that with the methods described, both members of a pair of bevel gears are cut conjugate to crown gears whose axes are offset from the axes of the gears themselves, whereas, in prior methods of cutting bevel gears, both members were generated conjugate to basic gears whose axes intersected the blank axes in their respective apexes.

In the case of both gear and pinion, the crown gear axis is preferably so located with reference to the blank axis that the crown gear apex lies on a line in the pitch plane of the crown gear drawn from the blank apex parallel to a tangent to a tooth side of the crown gear at a mean contact point, and moreover, the crown gear apex lies between the blank apex and the tooth normal at the mean contact point.

This arrangement is shown clearly in Figures 2 and 4. P (Fig. 2) is a mean point of contact between mating tooth surfaces of the gear and crown gear. 35 is a normal to the crown gear tooth surface, the path swept out by the tool, at this point of contact P. C is the center of curvature of the crown gear tooth surface passing through P. 18' indicates the position of the gear axis projected into the plane of the crown gear. The crown gear apex 36 lies on the line 37 drawn through the gear apex 38 parallel to the tangent T to a tooth side of the crown gear at the mean contact point P.

In cutting the pinion 20, the crown gear axis is located in a similar manner. P' is again a mean point of contact between the tooth surfaces of the pinion blank and crown gear, that is, the pinion blank and tool. C' is the center of curvature of the crown gear tooth surface passing through P'. 29' is the projected pinion axis. The crown gear axis 28 is again so offset from the blank axis 29 that the crown gear apex 40 lies between the blank apex 41 and the tooth normal 42 and on the line 43 drawn through the blank apex 41 parallel to the tangent T' to the tooth surface of the crown gear, the tool path, at the point P'.

The amount of offset of the crown gear axis can be readily determined by the known methods of descriptive geometry. The purpose is to avoid bias bearing. To effect this, the positions of the crown gears, used in the generating operation, are so determined that tooth surfaces are produced on the pinion and gear which will contact with each other in successive points of the normal tooth profile of the teeth in the median plane of the teeth, that is, in the plane containing the points P and P' respectively. The gear pair will actually contact along said normal profiles if in mating points of said profiles, that is, in points coinciding at any one instant during the mesh of the teeth, the tooth normals are so positioned that (1) they pass at the same distance from the respective gear apex or pinion apex; and (2) that the moments exerted upon the gear or pinion respectively by an equal force acting in the direction of the tooth normal at mating points of said normal profile are in the proportion of the respective tooth members of the gear and pinion.

The gears 15 and 20 cut in the manner described will mesh together with their axes 18 and 19 angularly disposed and intersecting and with their apexes 38 and 41 coinciding, as do bevel gears cut with other methods, and they will transmit true uniform motion.

While I have illustrated a preferred embodiment of my invention, it will be understood that the invention is capable of further modifications within the limits of the disclosure and the scope of the appended claims and that this application is intended to cover any variations, uses or adaptations of my invention, following, in general, the principles of the invention and including such departures from the present disclosure as come within known or customary practise in the gear art and as may be applied to the essential features hereinbefore set forth and as fall within the limits of the accompanying claims.

Having thus described my invention, what I claim is:

1. The method of producing a bevel gear with teeth of tapering depth, which consists in moving a pair of straight profiled finish cutting edges about the same axis in concentric curved paths across the face of a tapered gear blank to cut two side faces of the blank simultaneously, while imparting a relative movement between the tools and blank in the manner of a tapered gear meshing with a basic gear, other than its mate, whose axis is offset from the axis of the blank.

2. The method of producing a bevel gear with teeth of tapering depth, which consists in moving a pair of straight profiled finish cutting edges about the same axis in separate curved paths across the face of a tapered gear blank to cut two side faces of the blank simultaneously while imparting a relative movement between the cutting edges and blank in the manner of a gear meshing with a crown gear whose axis is offset from the axis of the blank.

3. The method of producing a bevel gear with teeth of tapering depth which consists in employing a rotary annular face mill provided with straight profiled cutting edges adapted to finish cut opposite side tooth faces of the blank, rotating said tool in engagement with a tapered gear blank to cut two side faces simultaneously, while imparting a relative movement between the tools and blank in the manner of a tapered gear meshing with a basic gear, other than its mate, whose axis is offset from the axis of the blank.

4. The method of producing a bevel gear with teeth of tapering depth, which consists in employing a rotary annular face mill provided with straight profiled cutting edges adapted to finish cut opposite side tooth faces of the blank, rotating said tool in engagement with a tapered gear blank to cut two side faces of the blank simultaneously, while imparting a relative movement between the tool and blank in the manner of a gear meshing with a crown gear whose axis is offset from the axis of the blank.

5. The method of producing a pair of bevel gears with teeth of tapering depth, which consists in cutting the side tooth surfaces of each member of the pair two sides simultaneously by moving a pair of straight profiled finish cutting edges about the same axis in separate curved paths across the face of a tapered gear blank while rotating the blank on its axis and simultaneously imparting an additional relative movement between the cutting edges and blank about an axis offset from the blank axis.

6. The method of producing a pair of bevel gears with teeth of tapering depth, which consists in cutting the side tooth surfaces of each member of the pair two sides simultaneously by moving a pair of straight profiled finish cutting edges about the same axis in separate curved paths across the face of a tapered gear blank, while imparting a relative movement between the cutting edges and blank in the manner of a gear meshing with a crown gear whose axis is offset from the axis of the blank.

7. The method of producing a pair of bevel gears with teeth of tapering depth, which consists in cutting the side tooth surfaces of each member of the pair by employing a rotary annular face mill provided with a plurality of cutting edges of straight profile, representing conical tooth surfaces of a basic gear, certain of said cutting edges being adapted to cut one side tooth face of the blank and other of said cutting edges being adapted to cut an adjacent side tooth face of the blank, and rotating said tool in engagement with a tapered gear blank to cut two side faces of the blank simultaneously, while imparting a relative movement between the tool and blank in the manner of a gear meshing with a basic gear, represented by the tool, whose axis is offset from the axis of the blank.

8. The method of producing a pair of bevel gears with teeth of tapering depth, which consists in cutting the side tooth surfaces of each member of the pair two sides simultaneously, by employing a rotary annular face mill, provided with a plurality of cutting edges of straight profile, representing conical tooth surfaces of a basic crown gear, certain of said cutting edges being adapted to cut one side tooth face of the blank and others of said cutting edges being adapted to cut an adjacent side tooth face of the blank, and rotating said tool in engagement with a tapered gear blank to cut two side faces of the blank simultaneously, while importing a relative movement between the tool and gear blank, in the manner of a gear meshing with the basic crown gear, represented by the tool, whose axis is offset from the axis of the blank.

9. The method of producing a bevel gear which consists in generating its side tooth surfaces two sides simultaneously, by moving a pair of straight profiled cutting edges about the same axis in separate curved paths across the face of a tapered gear blank, while imparting a relative movement between said cutting edges and blank in the manner of a gear meshing with a crown gear whose axis is offset from the axis of the blank in a direction parallel to a tangent to the path of a cutting edge at a mean contact point between said edge and blank and in a direction toward a normal to said path.

10. The method of producing a bevel gear which consists in generating its side tooth surfaces two sides simultaneously, by selecting a rotary annular face mill, having a plurality of cutting edges of straight profile, certain of which are adapted to cut one side tooth face of the blank and others an adjacent side tooth face, and in rotating said tool in engagement with a tapered gear blank, while imparting a relative movement between the tool and blank in the manner of a gear meshing with a crown gear whose axis is offset from the axis of the blank in a direction parallel to a tangent to the path of the cutting edges of the tool at a mean point of contact between the tool and blank, and toward a normal to said path.

11. The method of producing a pair of bevel gears with teeth of tapering depth, which consists in cutting the side tooth surfaces of each member of the pair by moving a straight profiled finish cutting edge in a curved path across the face of a tapered gear blank while rotating the blank on its axis and simultaneously imparting an additional relative movement between the cutting edge and blank about an axis offset from the blank axis.

12. The method of producing a pair of bevel gears with teeth of tapering depth which consists in cutting the side tooth surfaces of each member of the pair by moving a straight profiled finish cutting edge in a curved path across the face of a tapered gear blank while imparting a relative movement between the cutting edge and blank in the manner of a gear meshing with a crown gear whose axis is offset from the axis of the blank.

13. The method of producing a pair of bevel gears with teeth of tapering depth, which consists in cutting the side tooth surfaces of each member of the pair with a rotary annular face mill, having a plurality of cutting edges of straight profile, by rotating said tool on its axis in engagement with a tapered gear blank, while rotating the blank on its axis and simultaneously imparting an additional relative movement between the tool and blank about an axis offset from the blank axis.

14. The method of producing a pair of bevel gears with teeth of tapering depth, which consists in cutting the side tooth surfaces of each member of the pair with a rotary annular face mill, having a plurality of cutting edges of straight profile, by rotating said tool in engagement with a tapered gear blank while imparting a relative movement between the tool and blank in the manner of a gear meshing with a crown gear whose axis is offset from the axis of the blank.

ERNEST WILDHABER.